2,724,641

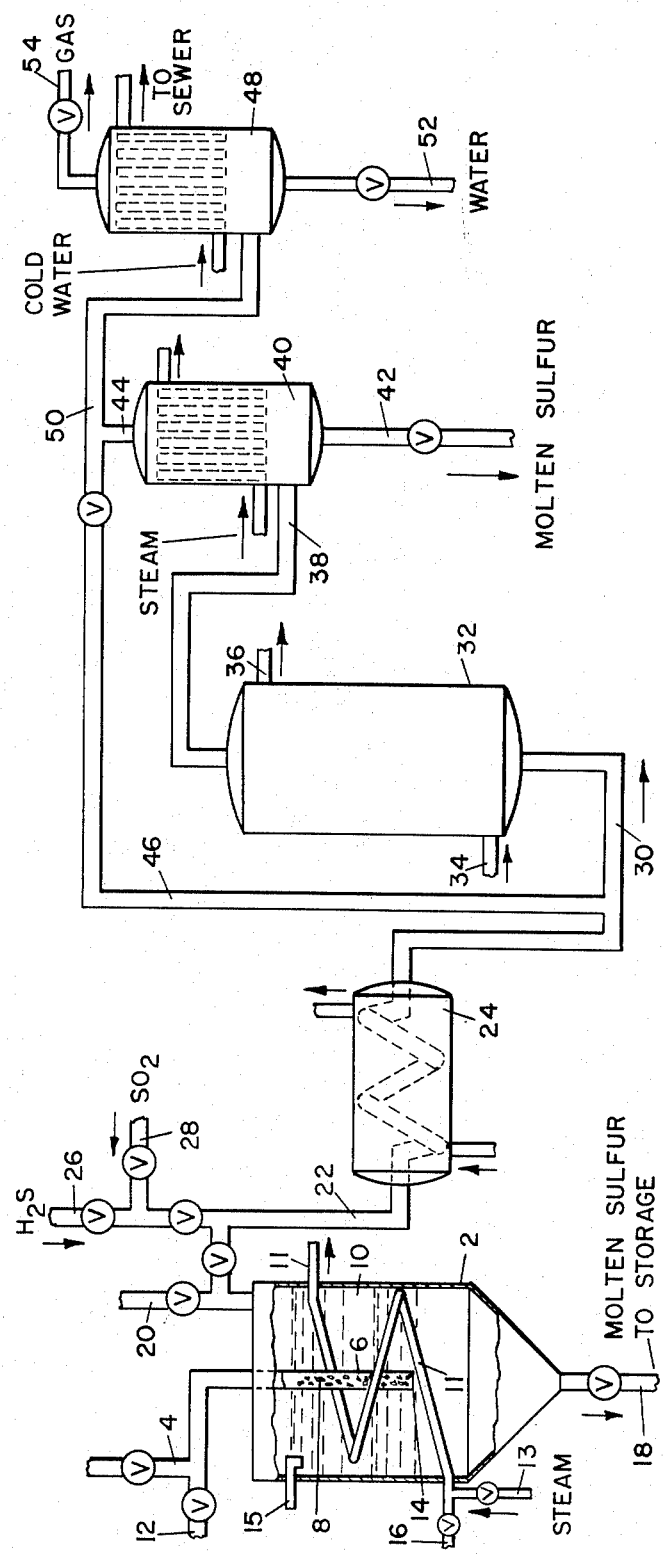

METHOD FOR RECOVERING ELEMENTAL SULFUR FROM GASES

John R. Butler, Jess E. Dew, and Donald G. Zink, Tulsa, Okla., assignors to Stanolind Oil and Gas Company, Tulsa, Okla., a corporation of Delaware Application April 25, 1951, Serial No. 222,874

7 Claims. (Cl. 23—225)

The present invention relates to the production and recovery of elemental sulfur from gases containing hydrogen sulfide, as, for example, the gases obtained in the process of sweetening sour gases, such as casinghead gas, natural gas or refinery gases. More particularly, it pertains to a method for recovering free sulfur from sour hydrocarbon or similar gases, in which hydrogen sulfide is present to an appreciable extent, by submerged combustion of such gases.

Until rather recently, industrial gases containing hydrogen sulfide have been regarded as a nuisance, and numerous methods have been devised for the disposal thereof. For example, gases of this type have generally been disposed of by burning them under boilers, stills and the like, thus converting the hydrogen sulfide to sulfur dioxide and water. While these products of combustion are less obnoxious than the original gas, the release of sulfur dioxide into the atmosphere is detrimental to vegetation and also readily corrodes metal surfaces of the equipment with which it comes into contact. In the manufacture of illuminating and fuel gas by the destructive distillation of coal, hydrogen sulfide is present in the crude gas; and, generally, the latter must be treated to remove the hydrogen sulfide before it can be marketed. Hydrogen sulfide is also a constituent of natural gas and is produced in petroleum refineries when operating on sour crudes, such as those obtained in certain areas of California, West Texas and Wyoming. In recent years, the increased demand for free sulfur coupled with the dwindling reserves of this highly important industrial raw material has caused considerable attention to be centered on cheap and effective methods for recovering elemental sulfur from sour petroleum and natural gases, as well as other hydrogen sulfide-containing gases derived from numerous manufacturing operations.

It has been known for many years that hydrogen sulfide or gases containing it could be burned in the presence of oxygen to produce a certain amount of elemental sulfur. Combustion reactions of this type can be conducted in the presence or in the absence of a catalyst. Generally, a catalyst is considered useful or desirable for this purpose when the percentage of combustible sulfur compounds in the gas being burned is rather low, i. e., about 10 per cent or less. When the quantity of combustible sulfur compounds present in a gas is sufficiently high to liberate considerable heat upon its incomplete combustion, thereby maintaining higher temperatures, oxidation catalysts are not so essential. In carrying out the process of producing sulfur by incomplete oxidation of hydrogen sulfide, however, certain difficulties are encountered. Thus, if the gas being treated contains a very high percentage of hydrogen sulfide or is burned at too high a rate, the temperature generated in the combustion chamber is excessive; and refractories are incapable of withstanding such conditions over extended periods.

In the past, considerable difficulty has been experienced in an effort to develop a process for effecting the aforesaid limited oxidation in the absence of an excessive temperature build-up since it was found that, generally, the gas temperature in the reaction zone increased to a point, if not externally removed, at which appreciable quantities of the product sulfur were oxidized to sulfur dioxide. In the early Claus-Chance process, partial control was obtained by limiting the capacity of a given furnace. In this manner, the rate of heat release could be balanced with radiation and convection losses from the furnace. Other modifications involved recycling the flue gases to the combustion zone. More recent modifications provide for combustion of approximately one-third of the hydrogen sulfide to sulfur dioxide with air followed by subsequent reaction of the remaining two-thirds of the hydrogen sulfide with the sulfur dioxide in the presence of a catalyst to produce elemental sulfur.

It is an object of our invention to provide a simple method for recovering elemental sulfur from gases of the aforesaid type, said method providing means whereby accurate control of the reaction temperature may be accomplished. It is a further object of our invention to effect the desired reaction at temperatures lower than normally employed, thereby eliminating the requirement for the use of relatively expensive refractory material while at the same time producing higher yields of free sulfur and less sulfur dioxide than are obtained by current procedures. A further object of our invention is to provide conditions for effecting combustion of hydrogen sulfide in the presence of other normally combustible gases, such as methane, whereby the latter are not oxidized owing to the combustion of hydrogen sulfide which occurs below the ignition temperature of said gases.

In accordance with an embodiment of our invention, submerged combustion of a hydrogen sulfide-containing gas is effected in a suitable liquid bath to obtain high yields of elemental sulfur and at the same time minimize sulfur dioxide formation, thus resulting in eliminating or greatly reducing the need for subsequent treatment of the exit gases to recover additional quantities of sulfur. As free sulfur is formed by the action of oxygen on hydrogen sulfide in a proportion of approximately 2 mols of hydrogen sulfide to 1 of oxygen, it condenses immediately in the liquid bath which is held at or slightly above the melting point of sulfur and either dissolves in said bath or forms a separate liquid layer that may be continuously or periodically withdrawn from the system.

Normally, we prefer to carry out the aforesaid submerged combustion process in a liquid water bath. The sulfur as formed condenses in the bath which is held at a temperature above the melting point of sulfur by proper regulation of the system pressure. The sulfur thus produced settles to the bottom of the bath and may be continuously withdrawn without further purification. While we generally prefer to operate the liquid bath at or slightly above the melting point of sulfur when using water or similar liquid, our invention may be effected at a bath temperature below the melting point of sulfur, thereby resulting in the production of sulfur in collodial form; and, under such circumstances, the reactor can be operated at atmospheric pressure. The resulting product may be used directly in the preparation of insecticides, fungicides and fertilizers. Substances which condense and dissolve the sulfur as produced under the conditions provided by our invention may be separated from a solution of sulfur and solvent by means of distillation or other methods outside the scope of our invention and returned to the liquid bath to replenish the solvent. Also, molten sulfur may, if desired, be used as a suitable material for the liquid bath in which combustion is carried out. When molten sulfur or similar liquid is used, the sulfur, as formed, condenses to form a homogeneous mass with the bath and a portion of the latter may be continuously withdrawn without further purification and sent to suitable storage vats.

While bath temperatures at least sufficient to maintain the product sulfur in the liquid state generally should be employed as pointed out above, we normally prefer to utilize a liquid bath having a temperature in a range from about 230° to 320° F. which is the region of low liquid sulfur viscosity. Where water or a similar liquid is employed, pressures of the order of from about 15 to about 150 p. s. i. a. should be utilized in order to maintain the bath at these temperatures. However, where it is desired to produce collodial sulfur in baths of the latter type, the bath temperature may be as low as about 200° F. The reaction itself may be carried out over a relatively wide temperature range, i. e., from about 400° to about 2000° F. At temperatures in excess of 2000° F., elemental sulfur in the presence of air is converted rather rapidly into sulfur dioxide. Therefore, in the majority of instances, we generally prefer to operate the combustion zone at somewhat lower temperatures, ranging from about 400° to about 1200° F.

Our invention may be further illustrated by reference to the accompanying drawing in which a mixture of air and gaseous hydrocarbon is initially introduced into reactor 2 through pipe 4 and ignited in burner 6 packed, if desired, with a suitable catalyst 8 for the oxidation of hydrogen sulfide such as, for example, bauxite. After ignition of the aforesaid gas mixture has been accomplished and the temperature of the liquid water bath 10 has been brought to the desired level by injecting superheated steam introduced into coil 11 through valved line 13, the hydrogen sulfide-containing gas is added to the system through pipe 12; and, as combustion proceeds, the hydrocarbon present in the gases added through pipe 4 is gradually eliminated. Some hydrocarbons may be present in the hydrogen sulfide-containing gaseous mixture added through line 12; however, if the reaction temperature is held below about 1000° F., it is found that combustion of the hydrogen sulfide occurs to the substantial exclusion of the normally gaseous hydrocarbons present. The quantity of air admitted to the system through pipe 4 is achieved in a manner such that the molar ratio of hydrogen sulfide to oxygen in combustion chamber 14 is about 2:1. The gases injected into chamber 14 are introduced under superatmospheric pressure. However, this pressure generally need not exceed about 125–150 p. s. i. a., the higher injection pressures ordinarily being required when water is employed as the liquid bath. Actually, the injection pressure necessary for satisfactory operation usually need only be about 25–30 p. s. i. g. in excess of that maintained on the system, i. e., sufficient pressure to maintain a relatively small gaseous zone in liquid bath 10 immediately below the combustion zone 14. The sulfur vapor produced in combustion zone 14 strikes the surface of liquid bath 10 and is condensed thereon. The temperature of the liquid bath is regulated by proper control of the reactor pressure and continuous addition of water to the bath through line 15 to replace that lost through evaporation. Further temperature control is obtained by means of heat transfer coil 11 by introducing water or other suitable coolant therein through valved line 16. As free sulfur is formed, molten sulfur is withdrawn from reactor 2 via valved line 18 and sent to storage; or, if considered necessary or desirable, it may be further purified. Ordinarily, in carrying out our invention, the gaseous products of combustion from which the sulfur vapor has been removed contains relatively little free sulfur or sulfur compounds and may be vented to the atmosphere through line 20. However, where warranted for economic reasons or where excessive damage may be caused by pollution of the atmosphere, residual quantities of hydrogen sulfide and sulfur dioxide in the stack gases withdrawn from reactor 2 may be introduced through line 22 into heater 24 which is maintained at a temperature in the range of from about 800 to 1000° F. The reaction $$2H_2S + SO_2 \rightarrow 3S + 2H_2O$$

as indicated by the equation, proceeds most efficiently to produce sulfur when the hydrogen sulfide and sulfur dioxide are present in a molar ratio of 2:1, respectively. The desired balance between these reactants present in the aforesaid stack gases may be achieved by adding makeup hydrogen sulfide or sulfur dioxide from any suitable source, as required, through lines 26 and 28. The hot hydrogen sulfide-sulfur dioxide mixture from heater 24 is thereafter charged into the bottom of jacketed reaction chamber 32 filled with a catalyst such as, for example, bauxite or silica containing minor amounts of aluminum oxide, boric anhydride, and sodium or potassium oxide. The catalyst may be in the form of a fixed or fluidized bed. Conversion of the sulfur dioxide and hydrogen sulfide into free sulfur and water vapor is effected in chamber 32 at a temperature in the neighborhood of 900° F., the temperature of reaction occurring in chamber 32 being controlled by the introduction of a suitable heat exchange medium, such as diphenyl, through jacketed vessel 32 at 34 and withdrawing said medium through line 36. Gaseous conversion products consisting chiefly of sulfur vapor and steam are taken overhead through line 38 to condenser 40 where free sulfur is condensed and is withdrawn in the form of a molten liquid through line 42. The stream withdrawn from the top of condenser 40 through line 44 may be split, if desired, and a portion thereof recycled through line 46 to reactor vessel 32 to convert unreacted hydrogen sulfide and sulfur dioxide into free sulfur. The remainder of this gaseous stream is sent to condenser 48 through line 50 where water is separated from the hydrocarbon component of the gaseous mixture by withdrawal through line 52. Gaseous hydrocarbons, if present, may be recovered from condenser 48 through line 54.

It should also be pointed out that, if desired, a battery of submerged combustion reactors connected to a suitable gas gathering or manifold system may be employed in place of a single larger reactor as described herein. Thus, in instances where the problem of heat dissipation becomes serious, its solution may be accomplished by utilization of the above-mentioned modification.

What we claim is:

1. In a process for the production of elemental sulfur by the direct oxidation of hydrogen sulfide in which the latter and oxygen are employed in a molecular ratio of about 2:1, the steps which comprise effecting reaction of a gaseous stream containing hydrogen sulfide, normally gaseous hydrocarbons and an oxygen-containing gas in the presence of a catalyst for said reaction, conducting the latter below the surface of a liquid bath held at a temperature of from about 230° to about 320° F., said reaction being carried out in a reaction zone maintained at a temperature of from about 400° to about 1000° F., and bringing the resulting hot products of said reaction into direct contact with said liquid bath whereby the aforesaid temperature range employed in said reaction zone is maintained.

2. The process of claim 1 in which molten sulfur is employed as the liquid bath.

3. The process of claim 1 in which sour natural gas is employed as the source of hydrogen sulfide.

4. In a process for the production of elemental sulfur by the direct oxidation of hydrogen sulfide in which the latter and oxygen are employed in a molecular ratio of about 2:1, the steps which comprise effecting reaction of a gaseous stream containing hydrogen sulfide, normally gaseous hydrocarbons and an oxygen-containing gas in the presence of a catalyst for said reaction, conducting the latter below the surface of a liquid water bath held at a temperature of from about 200° to about 320° F., said reaction being carried out in a reaction zone maintained at a temperature of from about 400° to about 1000° F. and at a pressure of from about 15 to about 150 p. s. i. a., and bringing the resulting hot products of said reaction into direct contact with said liquid water bath whereby the aforesaid temperature range employed in said reaction zone is maintained.

5. In a process for the production of elemental sulfur by the direct partial oxidation of hydrogen sulfide in which the latter and oxygen are employed in a molecular ratio of about 2:1, the steps which comprise effecting reaction of a gaseous stream containing hydrogen sulfide and free oxygen in the presence of a catalyst for said reaction, conducting the latter below the surface of a liquid bath held at a temperature of from about 230° to about 320° F., said reaction being carried out in a reaction zone maintained at a temperature of from about 400° to about 1000° F., and bringing the resulting hot products of said reaction into direct contact with said liquid bath whereby the aforesaid temperature range employed in said reaction zone is maintained.

6. The process of claim 5 in which water is employed as the liquid bath.

7. The process of claim 5 in which molten sulfur is employed as the liquid bath.

References Cited in the file of this patent

UNITED STATES PATENTS

| | | |
|---|---|---|
| 1,730,440 | Smith | Oct. 8, 1929 |
| 2,061,523 | Smith | Nov. 17, 1936 |
| 2,384,926 | Jones | Sept. 18, 1945 |
| 2,403,451 | Nevins | July 9, 1946 |
| 2,581,135 | Odell | Jan. 1, 1952 |

FOREIGN PATENTS

| | | |
|---|---|---|
| 242,681 | Great Britain | Nov. 12, 1925 |
| 282,508 | Great Britain | Dec. 28, 1927 |
| 623,264 | Great Britain | May 16, 1949 |